3,202,690
PREPARATION OF THIOCYANOPHENOLS
Edward P. Previc, Berwyn, Ill., assignor to Consolidation Coal Company, Pittsburgh, Pa., a corporation of Pennsylvania
Filed Oct. 8, 1962, Ser. No. 228,870
10 Claims. (Cl. 260—454)

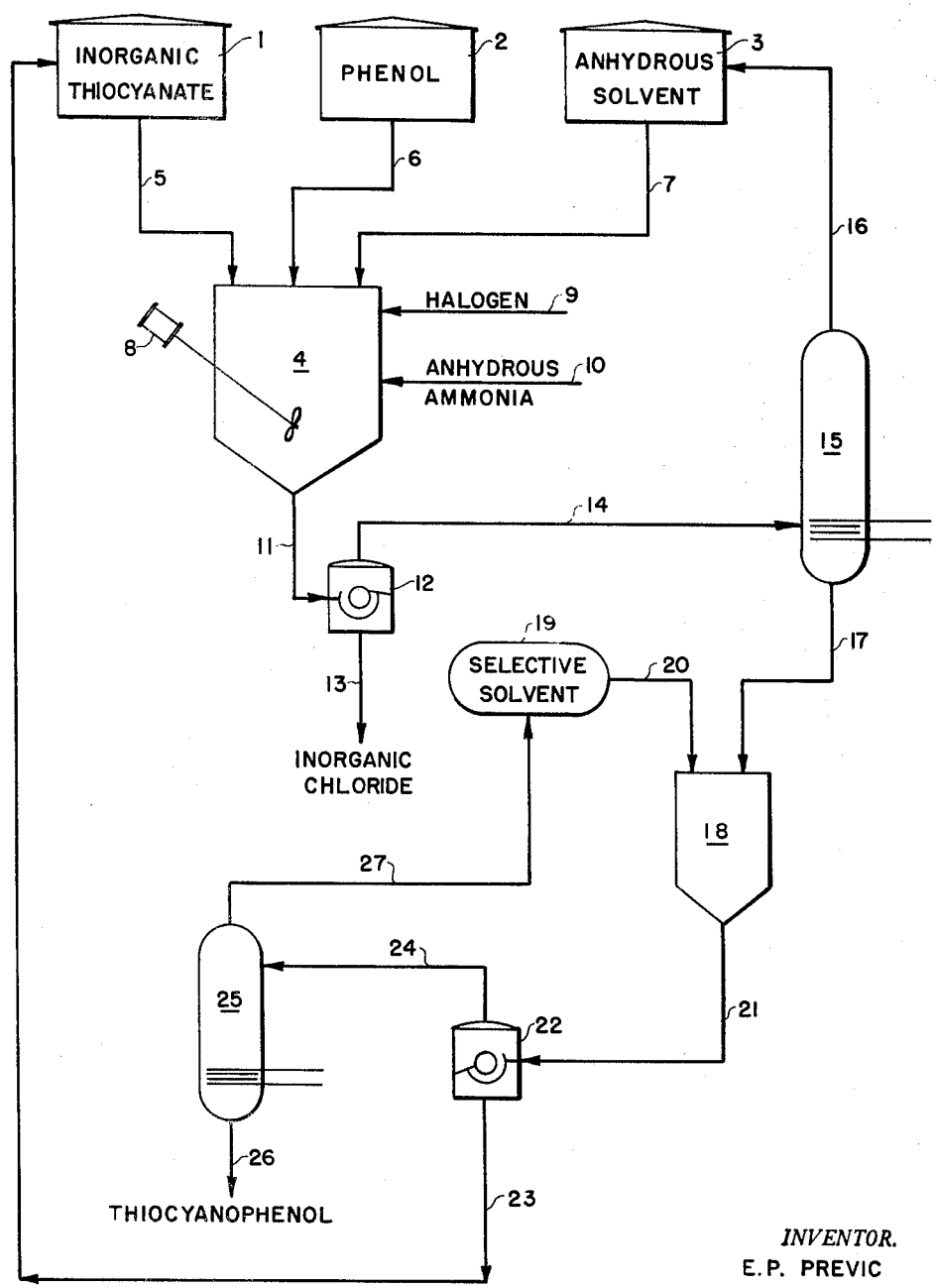

This invention relates to an improved process for the preparation of thiocyanophenols by thiocyanation of phenols.

Thiocyanophenols are nuclearly thiocyanated phenolic compounds well-known in the art. They show substantial biological activity, being effective as fungicides in the protection of leather goods and as antibacterial and antiparasitic agents. Several methods have been proposed and used for their preparation. The present invention is directed to an improvement in at least two of these general methods: (1) reaction of a phenol with free thiocyanogen in an organic solvent; (2) reaction of a phenol with "nascent" thiocyanogen liberated gradually in an organic solvent from an inorganic thiocyanate by various reagents.

Where thiocyanogen is liberated gradually from an inorganic thiocyanate, at least two basic techniques have been used. In the first, thiocyanogen is released from cupric thiocyanate by its dissociation to the cuprous salt. In the second, the phenol to be thiocyanated and an inorganic thiocyanate are dissolved in an anhydrous inert organic solvent, and a halogen, generally chlorine or bromine, is added to the solution at such a rate that the thiocyanogen reacts as fast as it is generated.

The foregoing methods, while useful in the laboratory for certain specific preparations, suffer from various drawbacks which militate against their effective commercial utilization. For example, the use of free thiocyanogen in solution is unsuitable commercially in that stable solutions are not readily attainable with common solvents, the thiocyanogen gradually undergoing decomposition. In the reaction of a phenol with thiocyanogen, in addition to the phenol being nuclearly thiocyanated in either the para or an ortho position, a molecular proportion of free thiocyanic acid is also formed. This free thiocyanic acid is readily polymerizable at slightly elevated temperatures, and is generally not readily recoverable, being ordinarily removed by water washing. The present invention is concerned with an improvement in the foregoing liquid-phase thiocyanation processes so that they may be practiced on a commercial scale obtaining consistently high yields of high purity products and substantial recovery of relatively expensive reactants and solvents. Although the improvement to be described is of general applicability to any of the foregoing thiocyanation processes, it is of particular commercial utility and applicability with respect to the generation of nascent thiocyanogen by the reaction of halogen and inorganic thiocyanate, and will be described in connection with this particular technique.

The general process for preparing a thiocyanophenol by reacting a phenol with an inorganic thiocyanate and a halogen in an anhydrous solvent is shown in U.S. Patents 1,765,678 and 1,790,097. In this process, in addition to the formation of the desired thiocyanophenol, the inorganic halide and thiocyanic acid are also formed. In the presence of the free thiocyanic acid that is formed, the formed thiocyanogen, even though evolved at a rate sufficient to react with the phenol in solution, apparently tends to be readily polymerized. Also, the continued presence of thiocyanic acid and halogen in solution leads to many side reactions resulting in lowered yields and product contamination. Further, recovery of the thiocyanophenol presents a problem because of the presence of the reactive constituents in the solution. Generally, the entire reaction mixture is added to water, and only the thiocyanophenol is recovered. Since some of the low molecular weight thiocyanophenols, particularly p-thiocyanophenol, have considerable water solubility or form undesired hydrates, a partial loss of the desired thiocyanophenol also occurs. The inert solvent used is frequently water soluble, such as glacial acetic acid or alcohol, and is not readily recoverable. Similarly, the thiocyanic acid is also water soluble and not ordinarily recoverable. In addition, the recovered product is not always of a high degree of purity because of the presence of free thiocyanic acid during the recovery procedure.

Most of these problems have been recognized by the prior art. As pointed out in U.S. Patent 1,816,848, in discussing the preparation of thiocyanophenols by the action of a halogen on a mixture of an inorganic thiocyanate and the phenol: "With the cheaper halogen, chlorine the yield is usually poor due to the many side reactions which take place. Some chlorination takes place and also considerable oxidation of the thiocyano derivative to a disulfide derivative. Also, the presence of free halogen tends to accelerate the polymerization of thiocyanogen. With the more expensive halogens, bromine and iodine, the yield is considerably better but the recovery of the halogens is not easy and thus the process becomes quite expensive." Thiocyanation reactions are also discussed in "Organic Reactions," vol. III, Chap. 6, pp. 240–66 (edited by R. Adams, Wiley & Sons, New York, 1946).

Accordingly, it is an object of the present invention to provide a method for the thiocyanation of phenols free from the objections of the known prior art. It is a further object to provide a method whereby the by-products of the reaction are readily recoverable. It is still another object to provide a commercially feasible method whereby thiocyanophenols are obtained in high yields and in high purity.

This invention involves the discovery that if the thiocyanic acid that is formed during the thiocyanation of a phenol by reaction with free or nascent thiocyanogen is first reacted with ammonia to form ammonium thiocyanate, the thiocyanophenol and the other reaction products may then be readily recovered. It is that addition of ammonia at this stage that is an essential feature of this invention. In the preferred and principal aspects of practicing this invention, the ammonia that is added is substantially anhydrous gaseous or liquid ammonia. The ordinary anhydrous ammonia of commerce, which may be employed in this process is considered to be substantially anhydrous for the practice of this invention even though it may contain slight amounts of water. This invention provides the first means for preparing thiocyanophenols which is adaptable to commercial exploitation because of the ready recovery of the organic solvent and of the thiocyanic acid as ammonium thiocyanate.

In accordance with a preferred aspect of this invention, a phenol and an inorganic thiocyanate are dissolved in an anhydrous solvent, and a halogen is added thereto to form the thiocyanophenol, thiocyanic acid, and inorganic halide, as is known to the art. However, in practicing an improvement in this process in accordance with the present invention, after thiocyanic acid is formed, anhydrous ammonia is added to the reaction system to form ammonium thiocyanate, prior to attempted recovery of the thiocyanophenol. Preferably the inorganic halide is insoluble in the inert solvent used to dissolve the phenol and inorganic thiocyanate. Then in a preferred aspect of practicing this invention, the reaction mixture is filtered to remove the insoluble inorganic halide, the inert solvent is then removed by distillation from the filtered reaction mixture, and a selective solvent in which the thiocyanophenol is soluble and in which the ammonium thiocyanate is insoluble is added to the distillation residue. After filtering off the ammonium thiocyanate, the thiocyanophenol is recovered by removing the selective solvent by distillation or evaporation. Both the ammonium thiocyanate and the inert solvent which are recovered are readily available for reuse in the process without further purification.

The foregoing procedure may be modified in that after addition of anhydrous ammonia to the reaction system and formation of ammonium thiocyanate, the inert solvent is removed by distillation. Then water, rather than a selective solvent, is added to the remaining reaction mixture, and the water-insoluble thiocyanophenol is recovered therefrom by filtration or solvent extraction.

If the reaction mixture is not first treated with ammonia prior to filtration or water treatment, recovery of the thiocyanophenol from the system after first distilling off the solvent is generally not feasible. Following filtration and attempted solvent recovery, contamination of the thiocyanophenol would occur because of polymerization of the free thiocyanic acid as well as reaction of the thiocyanophenol with the free thiocyanic acid. Where the reaction mixture is directly added to water, recovery of the solvent is not usually feasible, particularly for most solvents used. Solvent recovery is still difficult if not problematical because of the high reactivity and ready polymerizability of the free thiocyanic acid that is present.

In another and minor aspect of this invention, it is feasible to recover the formed thiocyanophenol, following addition of anhydrous ammonia, by treating the reaction mixture with water, recovering the thiocyanophenol by filtration, and then recovering the solvent by distillation from the aqueous phase. It is also possible to use aqueous ammonia in place of the two-step treatment with anhydrous ammonia and water. This more limited aspect would be of interest primarily where the thiocyanophenol is substantially insoluble in water, such as higher molecular weight thiocyanophenols. While in such a method the ammonium thiocyanate and inorganic halide formed would not be readily recoverable, the solvent used would be selected to be separable from the water by distillation or otherwise and hence could be readily recovered. The recovered thiocyanophenol would still be of a high degree of purity because of the absence of reactive free thiocyanic acid either in the aqueous system or during the subsequent recovery of the solvent from the system. Thus even where this relatively limited aspect of the invention is used, a solvent separable from water may be readily recovered without product contamination.

Any nuclearly hydroxylated aromatic compound having phenolic properties and a readily replaceable nuclear hydrogen atom in an ortho or para position can be used in the practice of this invention. These compounds, broadly designated as "phenols," can be monohydric or polyhydric, and may contain also other nonreactive nuclear substituents such as aliphatic, aromatic, or alicyclic hydrocarbon groups, alkoxy, amino, acyl, acylamino, or other noninterfering radicals. Acidic groups directly attached to the ring, such as $SO_3H$, interfere with the thiocyanation reaction and must first be neutralized. The term "phenols" as used broadly herein includes also hydroxylated polynuclear aromatic compounds such as the naphthols, hydroxyanthracenes, hydroxyquinolines, hydroxycarbazoles, and other nuclearly hydroxylated aromatics.

Preferred are monohydric phenols. Where these are nuclearly substituted, preferred substituent groups are hydrocarbon radicals, such as alkyl, cycloalkyl, aryl, alkaryl, and aralkyl groups. Typical phenols which can be used include phenol itself, o-, m-, and p-cresols, 2,3-, 2,4-, 2,5-, 2,6-, 3,4-, and 3,5-xylenol, resorcinol, alpha- or beta-naphthol, o-, m-, and p-phenylphenol, benzylphenol, cyclohexylphenol, benzoylphenol, thymol, carvacrol, 2-t-butylphenol, 4-t-butylphenol, 2,6-di-t-butylphenol, 4-t-butyl-o-cresol, 6-t-butyl-o-cresol, 2,4 - dimethyl-3-ethylphenol, amylphenol, 6-t-amyl-o-cresol, bis(p-hydroxyphenyl) propane, 4,4'-isopropylidenebis (o-cresol), 4,4'-methylenebis (o-cresol), saligenin, guaiacol, catechol, hydroquinone, 8-hydroxyquinoline, p-acetylaminophenol and pyrogallol.

This process is particularly applicable to the treatment of phenol itself and loyer-alkyl-substituted phenols having from 1 to 5 carbon atoms such as the cresols, xylenols, butylphenols, and the like.

Substantially any technique providing thiocyanogen maybe used herein. Conveniently, reaction of an inorganic thiocyanate salt with a halogen to liberate thiocyanogen may be used in this process. The advantages provided by the present invention are particularly noteworthy when used with the halogen treatment technique. Exemplary of suitable inorganic thiocyanate salts, particularly metal thiocyanate salts, are the thiocyanates of sodium, potassium, ammonium, calcium, copper, and lead. Conveniently, the alkali thiocyanates, in which group is included ammonium thiocyanate, according to the classification of Treadwell-Hall, are readily available and preferred for use. From a commercial point of view, the low cost of ammonium thiocyanate would make this compound particularly preferred. In addition, since an important feature characterizing this invention in its principal aspect is the recovery of ammonium thiocyanate, an initial use of ammonium thiocyanate means that this is the only metal thiocyanate salt that need be used. Where the ammonium thiocyanate is to be recirculated in the process, it is preferred from a process point of view that the starting thiocyanate consist of ammonium thiocyanate.

In practicing this invention, where the thiocyanogen is formed externally, and then used in a solvent, only problems with respect to solution of the thiocyanogen and the phenol arise. Any inert anhydrous solvent known to the art in which the thiocyanogen and the phenol are soluble and which is nonreactive with ammonia may conveniently be used. Suitable inert solvents include, for example, ethyl ether, saturated petroleum hydrocarbons such as octane, petroleum ether, etc., chlorinated solvents such as carbon tetrachloride, chloroform, hexachloroethane, etc., aromatic hydrocarbons such as benzene, toluene, etc., lower alkyl ($C_1$–$C_5$) alcohols including glycols, and lower alkyl acetates, etc. While glacial acetic acid and liquid sulfur dioxide can be used to dissolve the cyanogen and the phenol, because of the acidic nature of these solvents, they tend to react with the added ammonia and ordinarily would not be considered desirable for use as a solvent in this process. In the preferred aspects of this invention, nascent thiocyanogen is used, i.e., thiocyanogen formed by the in situ reaction of an inorganic thiocyanate with a halogen. The inorganic thiocyanate salt and the phenol are both soluble in the solvent used, which should preferably be substantially inert to attack by halogen as well as by the formed thiocyanic acid and nonreactive with ammonia. In the past, in order to prevent attack on the solvent by the halogen, it was considered necessary to saturate the solvent with an electrolyte such as sodium bromide or sodium chloride. However, with respect to the present invention, and applicable to most of the useful solvents, this salt-saturation technique has been eliminated. This makes the use of alcoholic solvents such as anhydrous methanol particularly convenient and economical.

It is of course highly desirable and preferable that both the solvent and the metal thiocyanate be selected so that the metal halide formed as a by-product of the reaction will be insoluble in the inert solvent utilized. By such a selection, the by-product metal halide is readily precipitated and conveniently filtered out of solution. Generally, the use of a polar solvent which is of an inert and neutral character is particularly preferred, such as the lower alkyl alcohols and lower alkyl acetates. Anhydrous methanol has been found to be particularly desirable as a solvent because of its ready availability, low price, and because substantially all of the metal halides formed, particularly ammonium chloride, are insoluble therein. The saturation of the methanol with an alkali halide is not required where the various reaction parameters are suitably coordinated.

Chlorine is preferred among the halogens because of its ready availability, low cost, and rapid rate of reaction. With practice of the present invention, the objections hitherto existing to the use of chlorine because of the many side reactions which occurred, have been eliminated. Thus resort to the more expensive bromine and iodine has been obviated.

In the sole figure of the drawing is shown a diagrammatic representation of the principal and preferred aspect of the process of this invention. This aspect relates to the use of the halogen reaction technique for generating nascent thiocyanogen in conjunction with the anhydrous ammonia treatment, followed by the use of a selective solvent recovery technique for recovering all products formed.

Referring to the drawing, the inorganic thiocyanate in a storage vessel 1, a phenol in a storage vessel 2, and an anhydrous solvent in a storage vessel 3 are added to a reaction vessel 4 by way of conduits 5, 6, and 7, respectively. Reaction vessel 4 is equipped with a stirrer 8 and has provision for external cooling, not shown. Exemplary reactants are ammonium thiocyanate, m-cresol, and anhydrous methanol. Generally a slight molar excess, less than 10 percent of inorganic thiocyanate above the stoichiometric requirements of 2 moles of thiocyanate per mole of phenol is used to insure a high conversion of the phenol. Sufficient anhydrous solvent is used to dissolve the inorganic thiocyanate and the phenol and at the same time provide sufficient fluidity for stirring the slurry that is formed when the inorganic halide salt is formed during the course of the reaction. Conveniently, additional solvent may be added during the course of the reaction. Halogen is added to reaction vessel 4 by means of a conduit 9. Preferably, chlorine is used in an amount slightly in excess of that required stoichiometrically, corresponding to the excess thiocyanate used, and the system is preferably maintained at atmosphere pressure at a temperature between 0 and 10° C. Since an exothermic reaction occurs, external cooling will generally be required. While temperatures for this reaction as low as −70° C. and as high as 50° C. may be utilized, too low a temperature unduly prolongs the reaction time, and too high a temperature may lead to extensive polymerization of the thiocyanic acid that is formed during the reaction. The halogen is controllably fed to reaction vessel 4 so that the thiocyanogen generated by reaction of the halogen with the inorganic thiocyanate can react with the phenol as fast as it is generated. The reaction is substantially completed in from 5 minutes to 20 hours. The reaction times that are required depend substantially on the temperature of the reaction and on the heat-transfer requirements; the rate of halogen feed, solubility of the phenol in the solvent, and the like also have an effect.

Anhydrous ammonia is then fed to reaction vessel 4 by way of a conduit 10. Since the neutralization of the thiocyanic acid by the ammonia is an exothermic reaction, the temperature must be maintained below 50° C., and preferably below 25° C., using external cooling where required. Inasmuch as substantially anhydrous conditions must be maintained during the entire reaction to achieve optimum conversion, this is conveniently accomplished when the reaction is conducted at essentially atmospheric pressure by use of a closed reaction vessel. Sufficient anhydrous ammonia is added to react with the thiocyanic acid that is formed. For each mole of thiocyanogen utilized in the thiocyanation reaction, one mole of thiocyanic acid is generated. The anhydrous ammonia reacts with the thiocyanic acid forming ammonium thiocyanate, thereby effectively tying up this highly reactive compound chemically so that it is unavailable for undesired side reactions. Where the starting inorganic thiocyanate in vessel 1 is ammonium thiocyanate, only ammonium halide will be formed in the reaction vessel, in addition to the desired thiocyanophenol and ammonium thiocyanate.

The slurry from reaction vessel 4 is discharged through a conduit 11 to a filter 12, the insoluble inorganic chloride being recovered through a conduit 13. Alternatively, but less desirably, decantation and settling techniques may be used. The filtrate, containing the thiocyanophenol and ammonium thiocyanate dissolved in an inert solvent is fed through a conduit 14 to a solvent recovery still 15 where the anhydrous solvent is removed as an overhead product from still 15 and returned by way of a conduit 16 to storage vessel 3. Inasmuch as there is no free thiocyanic acid present at this solvent-stripping stage, the removal of the anhydrous solvent is readily accomplished at slightly elevated temperatures, preferably under vacuum, without causing polymerization of thiocyanic acid or contamination of the thiocyanophenol.

The residue from still 15, consisting of the thiocyanophenol and the ammonium thiocyanate, is fed by way of a conduit 17 to a mixing vessel 18. A selective solvent in a storage vessel 19 is fed by way of a conduit 20 to mixing vessel 18. This selective solvent is one in which the thiocyanophenol is soluble and in which the ammonium thiocyanate is insoluble. Alternatively, a selective solvent may be used in which both the thiocyanophenol and the ammonium thiocyanate are soluble at elevated temperatures and in which the selectivity is obtained upon cooling the solvent. By use of such a solvent the residue in still 15 may be completely dissolved and then the separation subsequently effected by cooling the solution.

The choice of the selective solvent will be determined in part by the solubility of the particular thiocyanophenol being recovered as well as by considerations of convenience and economy. In general, paraffinic or aromatic hydrocarbons are preferred as these readily dissolve the thiocyanophenols, and ammonium thiocyanate is substantially insoluble therein. Where higher molecular weight thiocyanophenols are being recovered, solvents such as cyclohexane or heptanes may conveniently be used. For lower molecular weight thiocyanophenols, lower molecular weight aromatic solvents such as benzene and toluene are preferred. Toluene has been found particularly effective for use with the thiocyanated lower molecular weight phenols such as phenol itself, cresols, and xylenols.

The slurry from mixing vessel 18 is fed by way of a conduit 21 to a filter 22 where separation of the ammonium thiocyanate from the thiocyanophenol is effected. The insoluble ammonium thiocyanate is returned by way of a conduit 23 to storage vessel 1 for reuse in the system. Thereby, the net consumption of inorganic thiocyanate is cut in half compared with prior art processes. The filtrate containing the thiocyanophenol dissolved in the selective solvent is fed by way of a conduit 24 to a solvent recovery still 25. The thiocyanophenol is removed by way of a conduit 26, the solvent being returned by way of a conduit 27 to storage vessel 19.

By use of the foregoing process, the ammonium thiocyanate formed is reuseable in the process without further purification. Similarly, the anhydrous solvent is readily recycled for reuse. In the foregoing process, the crude thiocyanophenol dissolved in the selective solvent may be directly recovered from conduit 24 for use as an intermediate in further processing. Alternatively, as shown, the dissolved thiocyanophenol may be separately recovered.

In practicing this invention, in order to obtain high conversions of phenols and high yields of the thiocyanophenols, it is considered essential that the anhydrous ammonia be added to the system after the phenol has already reacted with the thiocyanogen, but prior to attempted recovery of reaction products. Where nascent thiocyanogen is used, the ammonia must not be present in the system prior to the generation of thiocyanogen by reaction of halogen with inorganic thiocyanate. It has also been found that alternating addition of portions of the halogen and of the anhydrous ammonia also deleteriously affects the conversion and yield.

The following examples illustrate this invention, but are not to be construed as limitations thereof.

EXAMPLE 1

*Thiocyanation of phenol*

Phenol (analytical reagent grade), 908 g. (9.66 moles), was dissolved in 4 liters of absolute methanol along with 1543 g. (20.3 moles, 5% excess) of dry ammonium thiocyanate. To this mixture at 0° ±5° C. was added 720 g. (10.15 moles) of chlorine over a two-hour period. Stirring was then continued for one hour at 0° C. prior to the addition of 173 g. anhydrous ammonia (over a period of one hour). Stirring was again continued one hour after ammonia addition. Then the slurry was filtered, and the ammonium chloride filter cake was reslurried with 1500 ml. methanol and refiltered.

The combined filtrates were distilled to a still temperature of 50° C. at 5 mm. Hg, and the resulting paste was reslurried with one liter of benzene and filtered. The filter cake was again reslurried with one liter of benzene and refiltered. The filter cake containing the recovered ammonium thiocyanate, 792 g., was dried in vacuo at 100° C.

The combined benzene filtrates were rewarmed to 34° C., and 500 ml. hexane was added slowly with stirring. The solution was seeded with authentic p-thiocyanophenol, and, as crystals began to grow, another 500 ml. hexane was added slowly. The solution was cooled gradually, and a first crop of crystalline p-thiocyanophenol, 423 g., was removed by filtration and vacuum dried at 50° C., melting point 61–63° C. The filtrate was distilled to remove solvents, leaving a residue (1034 g.) of p-thiocyanophenol.

EXAMPLE 2

*Thiocyanation of o-cresol*

(a) *Water recovery of 4-thiocyano-o-cresol.*—A two-liter flask equipped with stirrer was charged with 319.5 g. ammonium thiocyanate (4.2 moles), 216.2 g. o-cresol (2 moles), and 500 ml. methanol. The slurry was cooled to 3° C., and 0.149 g. chlorine (2.1 moles) was added over a period of two hours at a temperature between −5° and +3°, using external cooling. After stirring the cold reaction mixture an additional half-hour, 36 g. ammonia (2.1 moles) was added at a temperature between −10 and +10° C. for 68 minutes. The slurry was stirred for a half-hour and then vacuum filtered in the cold. The filter cake was washed with 200 ml. methanol, then dried in vacuo at 100° C. to yield 214.1 g. ammonium chloride (96% of theory).

The methanolic filtrates were transferred to a distilling flask with an additional 50 ml. methanol, and solvent was removed at 50 mm. Hg pressure using a Dry-Ice cooled condensing system to a final still temperature of 50° C. The residual oily slurry of salt was poured into 2 liters of ice water with stirring. The 4-thiocyano-o-cresol crystallized readily and was collected by vacuum filtration. It was washed with water and dried to yield 359.5 g. of a yellow solid, crude 4-thiocyano-o-cresol, melting point 55–60° C. The crude material was recrystallized from hot toluene, washed with hexane, and dried. A first crop yield of 235 g., M.P. 65–72° C., was obtained. A second crop yield of crystals, 30 g., was also obtained.

(b) *Toluene recovery of 4-thiocyano-o-cresol.*—A five-liter flask was charged with 639 g. ammonium thiocyanate (8.38 moles), 433 g. of freshly redistilled o-cresol (4 moles), and 1000 ml. of dry methanol. The stirred slurry was cooled to −8° C., 298 g. (4.2 moles) of chlorine was added over a period of two hours at −8 to +15° C., mostly near +3° C. The cold slurry was further stirred. Then 72 g. of anhydrous ammonia was added over a period of about an hour at −1 to +12° C. After 17 minutes, the cold slurry was vacuum filtered, and the filter cake was washed with 400 ml. methanol. The dried filter cake of ammonium chloride weighed 463 g. (99.5% of theory).

The methanolic filtrates were distilled at 50 ml. to a still temperature of 50° C. Recovered was 1174 ml. of solvent. The residual slurry was treated with 900 ml. toluene and warmed to 50° C. over a period of one hour. The resulting slurry was vacuum filtered, and the filter cake was washed with 200 ml. toluene and vacuum dried to yield 382 g. of ammonium thiocyanate.

Toluene was distilled off from the filtrate (under reduced pressure), and the residue was crystallized to yield a first crop, 298 g., of 4-thiocyano-o-cresol, M.P. 67.5–70.5° C.

Using essentially the foregoing stoichiometry and reaction procedures, o-cresol was thiocyanated using only crude ammonium thiocyanate recovered from a previous experiment. Substantially the same results were obtained as in the preceding experiment.

(c) *Large-scale synthesis of 4-thiocyano-o-cresol.*—A 12-liter flask was charged with 1081.3 g. (10.0 moles) o-cresol, 1598 g. (21.0 moles. 5% excess) ammonium thiocyanate, and 3000 ml. dry methanol. The reactants were cooled with stirring to −4° C. Chlorine was then added at a rate that 755 g. (10 moles plus about 5% excess) was added in 1½ hours. Stirring was continued at 0° to ±5° C. for one hour. Then 178 g. ammonia was added in ½ hour to neutralize the formed thiocyanic acid. Stirring was continued for an additional hour, and the mixture was then filtered. The ammonium chloride filter cake was reslurried with 1500 ml. methanol and refiltered. The filtrate was distilled to a still temperature of 50° C. at 50 mm. Hg to remove 3740 ml. methanol. Then 2050 ml. toluene was added, heated to 50° C. for one hour, and filtered. The ammonium thiocyanate filter cake was reslurried with 100 ml. of hot toluene and refiltered. The toluene-insoluble recovered ammonium thiocyanate was vacuum dried, wt. 771 g. (theo. wt., 761–837 g.). The combined filtrates were distilled under vacuum to remove toluene (3110 ml.), the crude thiocyano-o-cresol, which solidified on standing, being obtained in a yield in excess of 90 percent.

(d) *Large-scale synthesis of 4-thiocyano-o-cresol using recycle ammonium thiocyanate.*—Orthocresol, 1081.3 g. (10.0 moles), and 1598.0 g. (21.0 moles, 5% excess)

of ammonium thiocyanate (1253 g. recycle and 345 g. fresh) were dissolved in 3000 ml. methanol at 0° C. Then 755 g. chlorine (5% excess) was added at 0° ±5° C. over a 1¾ hour period, followed by ½ hour stirring. The thiocyanic acid was neutralized with 178 g. ammonia over a ½ hour period, again followed by ½ hour stirring, all at 0° C. The slurry was filtered, and the ammonium chloride filter cake was reslurried with 2200 ml. methanol and refiltered. The combined filtrates were distilled to 50° C./50 mm. Hg to remove 4930 ml. methanol (95% of theory). Then 2 liters of toluene was added, and the slurry was heated to 50° C. and filtered. The ammonium thiocyanate filter cake was reslurried with 1 liter of toluene at 50° C. and refiltered. The filter cake of recovered ammonium thiocyanate was vacuum dried at 70° C., wt. 723 g. (theo. wt. 761–837 g.). The toluene solution was distilled at a still temperature of 100° C. at 0.5 mm. Hg, with stirring, to remove toluene. A portion of the crude product was recrystallized from toluene in 87.5% yield in four crystal crops having melting points, respectively, of 71.5–73° C., 72–73.5° C., 67–71° C., and 67–71° C.

EXAMPLE 3

Thiocyanation of m-cresol

To a 12 liter flask were charged 1081.3 g. (10.0 moles) of m-cresol, 1598 g. (21.0 moles, 5% excess) of fresh ammonium thiocyanate, and 3 liters methanol. The reactants were cooled to 0 ±5° C., and 770 g. chlorine was added at +2° to −9° C. over a 2-hour period. Stirring was continued for one hour. Then 178 g. anhydrous ammonia was added in one hour also at about 0° C. Stirring was continued for another hour, and the slurry was then filtered. The ammonium chloride filter cake was reslurried with 1500 ml. methanol and refiltered and washed on the filter with 500 ml. additional methanol.

The methanol filtrates were combined and distilled at 50° C. 50 mm. Hg. Then 2 liters toluene was added, and the slurry was heated at 50° C. for one hour with stirring, prior to filtration. The ammonium thiocyanate filter cake, 770 g. (761–873 g. theoretical) was reslurried with 1 liter toluene at 50° C. and refiltered.

The combined toluene filtrates were distilled to a final still temperature of 50° C., about 0.5 mm. Hg. The resultant yellow viscous oil was redissolved in toluene at 90° C., filtered, and cooled. A first crop of crystals of 4-thiocyano-m-cresol was dispersed in pentane, refiltered, and dried: 1186 g., M.P. 68–74° C. The liquor from the crystallization yielded an adidtional 495 g. On an overall basis, 98.8% of m-cresol was converted, in a yield of 95.4%.

EXAMPLE 4

Synthesis of 4-thiocyano-m-cresol (aqueous recovery)

A 3-liter reaction flask was charged with 482 g. ammonium thiocyanate, 325 g. m-cresol, and 866 g. methanol. The stirred slurry was cooled to 10°, and 227 g. chlorine was charged at a constant rate over a period of approximately 8 hours at 10–12°. Ammonia was then charged at a temperature between 10 and 25° over a period of about two hours.

After reaction had been completed, methanol was distilled from the stirred slurry under slight vacuum to a final temperature of 80° at 246 mm. Hg. Recovered methanol was 766 g. To the residue, after removal of the methanol as above by distillation, was added 786 g. toluene at room temperature, and the mixture was stirred for 5 minutes. Then 800 g. of hot water was added, and stirring was continued for an adidtional 5 minutes. The mixture was then transferred to a separatory funnel, and the lower aqueous phase including some undissolved salts was removed. The upper toluene phase contained the dissolved 4-thiocyano-m-cresol, which was present in greater than 75 percent based on the converted m-cresol.

EXAMPLE 5

Synthesis of 2-t-butyl-4-thiocyanophenol (aqueous recovery)

Using essentially the method shown in Example 2a, a 2-liter flask was charged with 300 g. (2 moles) of 2-t-butylphenol, 600 ml. of absolute methanol, and 320 g. ammonium thiocyanate (4.2 moles). The slurry was cooled to 3° C. Then 149 g. chlorine was added over a period of 2 hours at −3 to +3° C. After one-half hour additional stirring, 36 g. of ammonia was charged (50 minutes at −1° to −10° C.). The slurry was stirred a half-hour, then was vacuum filtered. The ammonium chloride filter cake was washed with 200 ml. methanol. The methanolic filtrates were transferred to a distilling flask, using an additional 40 ml. methanol; then 640 ml. methanol was removed by distillation at a still temperature of 50° C. (50 mm. Hg). The residual slurry was poured with stirring into 2 liters of ice water. The heavy oil which precipitated was dissolved in 150 ml. of methylene chloride. The soltuion was washed with water and dried over magnesium sulfate. Solven and 7 g. unreacted starting material were removed to a final still temperature of 103° C. at 0.75 mm. Hg pressure. A yield of 221 g. 2-t-butyl-4-thiocyanophenol was obtained. An additional 161 g. of product was recovered from the filter cake following water washing. The melting point of recrystallized product (from hexane) was 68–70° C. The over-all conversion of 2-t-butylphenol was 87.5%, with an 86.4% yield of final product based on converted material.

EXAMPLE 6

Thiocyanation of 2,6-xylenol (acetonitrile solvent)

A mixture consisting of 244 g. (2.0 moles) of 2,6-xylenol (98% purity), 310 g. (4.0 moles) of ammonium thiocyanate, and 250 g. acetonitrile was stirred at −20° C. To this mixture was added 142 g. chlorine (2.0 moles) over a period of one hour. The exothermic reaction was maintained at −15 to −23° C. by cooling. One-half hour after completion of the chlorine addition, 34 g. of anhydrous ammonia was added over a two-hour period. Because of increase in viscosity of the slurry, 600 ml. hexane was added to facilitate stirring. The inorganic salts that formed were removed by filtration and washed twice with ethyl ether to yield 383 g. of a light-yellow solid.

The original filtrate and ether washes were combined and distilled at a still temperature up to 140° C. at atmospheric pressure. After recovery of the acetonitrile, the solid that remained in the still was dissolved in 500 ml. of boiling toluene, filtered, and cooled to yield 235 g. of crystalline yellow solid, 4-thiocyano-2,6-xylenol, M.P. 96–99° C.

EXAMPLE 7

Synthesis of 4-thiocyano-6-t-butyl-o-cresol (water recovery)

A five-liter flask was charged with 4 moles (658 g.) of 6-t-butyl-o-cresol, 1200 ml. absolute methanol, and 640 g. ammonium thiocyanate. The stirred slurry was cooled to 0° C., and 300 g. chlorine was added over a period of 1¼ hours at 0° to +7° C., using external cooling. Toward the end of the addition, 200 ml. methanol was added to permit continued stirring of the dense slurry. After an additional 68 minutes at 0° C., 71 g. ammonia was added over a period of 32 minutes at 0° C. After stirring for ½ hour, the slurry was poured into 4700 ml. water. The crude crystalline product was recrystallized from boiling hexane in 87% yield of product, M.P. 85–87° C.

EXAMPLE 8

Synthesis of 4-thiocyano-6-t-butyl-m-cresol (water recovery)

A 2-liter flask was charged with 328.5 g. of 6-t-butyl-m- cresol (2.0 moles), 320 g. ammonium thiocyanate, and 600 ml. absolute methanol. The stirred slurry was cooled to 0° C., and 149 g. chlorine was added over a period of 4 minutes at 0–9° C., using external cooling. Stirring was then continued for ½ hour at 0° C., and 36 g. ammonia was added over a period of 30 minutes at 0–9° C. with cooling. Stirring was continued for an additional ½ hour at 0° C., and the smooth slurry was poured into two liters of ice water with rapid mechanical stirring. The product was separated, washed with water by decantation, filtered, and dried under vacuum. The dried product was triturated with hexane at room temperature to form an easily poured slurry. The latter was vacuum filtered, and the cake was washed with additional hexane. The product was white to light yellow, and after drying in air overnight was a white, dry powder 354.6 g. The white powder was recrystallized from a mixture of benzene and cyclohexane to yield 205 g. of colorless platelets, M.P. 113–116° C.

The hexane filtrates were distilled at atmospheric pressure to a temperature of 120° C. to remove hexane. The distillation was then continued at 1.0 mm. pressure to recover 61 g. of distillate to a still temperature of 150° C. Based on the foregoing, the yield of product obtained was 98 percent of theory based on converted 6-t-butyl-m-cresol.

EXAMPLE 9

*Synthesis of 4-thiocyano-2,6-di-t-butylphenol (water recovery)*

A five-liter flask was charged with 4 moles (826 g) of 2,6-di-t-butylphenol, 640 g. (8.4 moles) of ammonium thiocyanate, and 1200 ml. absolute methanol. The stirred mixture was cooled to 0° C., and 300 g. chlorine was added over a period of 70 minutes at 0° C. After an additional 33 minutes of stirring at 0° C., 75 g. ammonia was charged (0° C., 48 minutes). Then after 79 minutes at 0° C., the reaction mixture was poured with vigorous mechanical stirring into 4 liters of ice water. The product initially separated as an oil, then gradually crystallized. After one hour (10° C.) the crystal slurry was filtered, the cake was washed with water and dried in air overnight. The resulting granular yellow solid weighed 1371 g. The purified material was recovered from a yellow solid by crystallization from pentane in an 82.5 percent yield (first and second crops) M.P. 64–66.5° C. On an overall recovery, 96.4% of 2,6-di-t-butylphenol was converted in a yield of 89.8% of 4-thiocyano-2,6-di-t-butylphenol, based on converted material.

It will be readily apparent that various modifications may be made in the practice of this invention without departing from the spirit thereof. Thus, while in accordance with the provisions of the patent statutes, the principle, preferred construction and mode of operation of the invention have been explained, and what is now considered to represent its best embodiment has been illustrated and described, it should be understood that, within the scope of the appended claims, the invention may be practiced otherwise than as specifically illustrated and described.

The embodiments of the invention in which an exclusive property or privilege is claimed are defined as follows:

1. A process for preparing a thiocyanophenol which comprises dissolving a phenol selected from the class consisting of phenol and a lower alkyl phenol and ammonium thiocyanate in an inert anhydrous solvent therefor, adding chlorine to the solution to liberate thiocyanogen to react with said phenol whereby the thiocyanophenol and thiocyanic acid are formed, adding anhydrous ammonia to said solution at a temperature below 50° C. in an amount at least sufficient to neutralize the thiocyanic acid to form ammonium thiocyanate, and subsequently recovering the thiocyanophenol.

2. A process for preparing a thiocyanophenol which comprises dissolving a lower alkyl phenol and ammonium thiocyanate in an inert anhydrous solvent therefor, adding chlorine to the solution to liberate thiocyanogen to react with said phenol whereby the thiocyanophenol and the thiocyanic acid are formed, adding anhydrous ammonia to said solution at a temperature below 50° C. in an amount at least sufficient to neutralize the thiocyanic acid to form ammonium thiocyanate, recovering the reaction products, and isolating the thiocyanophenol therefrom by solution in a selective anhydrous solvent therefor.

3. A process for preparing a thiocyanophenol which comprises dissolving a lower alkyl phenol and ammonium thiocyanate in anhydrous methanol, adding chlorine to the solution to liberate thiocyanogen to react with said phenol whereby the thiocyanophenol and thiocyanic acid are formed, adding anhydrous ammonia to said solution at a temperature below 25° C. in an amount at least sufficient to neutralize the thiocyanic acid to form ammonium thiocyanate, recovering the reaction products, and isolating the thiocyanophenol therefrom by solution in a selective anhydrous solvent therefor.

4. The process according to claim 3 wherein said selective solvent is toluene.

5. A process for preparing thiocyanophenol which comprises dissolving a lower alkyl phenol and ammonium thiocyanate in anhydrous methanol, adding chlorine to the solution to liberate thiocyanogen to react with said phenol whereby the thiocyanophenol, ammonium chloride, and thiocyanic acid are formed, adding anhydrous ammonia to said solution at a temperature below 25° C. in an amount at least sufficient to neutralize the thiocyanic acid to form ammonium thiocyanate, filtering the solution to recover ammonium chloride and a methanol filtrate, distilling the methanol filtrate to recover the methanol and obtain a residue containing the thiocyanophenol and ammonium thiocyanate, treating said residue with a selective anhydrous solvent to dissolve the thiocyanophenol and leave the ammonium thiocyanate as residue, recovering the ammonium thiocyanate, and distilling off said selective solvent from the thiocyanophenol-containing solution to recover the thiocyanophenol as still residue.

6. The process according to claim 5 wherein said selective solvent is toluene.

7. The process according to claim 5 wherein the ammonium thiocyanate is recycled in the process.

8. A process for preparing 4-thiocyano-m-cresol which comprises dissolving m-cresol and ammonium thiocyanate in anhydrous methanol, adding chlorine to the solution to liberate thiocyanogen to react with said m-cresol whereby 4-thiocyano-m-cresol, ammonium chloride, and ammonium thiocyanate are formed, adding anhydrous ammonia to said solution at a temperature below 25° C. in an amount at least sufficient to neutralize the thiocyanic acid to form ammonium thiocyanate, filtering the solution to recover ammonium chloride and a methanol filtrate, distilling the methanol filtrate to recover the methanol and obtain a residue containing ammonium thiocyanate and 4-thiocyano-m-cresol, treating said residue with toluene to dissolve the 4-thiocyano-m-cresol and leave the ammonium thiocyanate as residue, recovering the ammonium thiocyanate, and distilling off the toluene from said solution to recover the 4-thiocyano-m-cresol as still residue.

9. A process for preparing a thiocyanophenol which comprises dissolving a lower alkyl phenol and ammonium thiocyanate in anhydrous methanol, adding chlorine to the solution to liberate thiocyanogen to react with said phenol whereby the thiocyanophenol, ammonium chloride, and ammonium thiocyanate are formed, adding anhydrous ammonia to the reaction mixture at a temperature below 25° C. in an amount at least sufficient to neutralize the thiocyanic acid to form ammonium thiocyanate, distilling the reaction mixture to recover the methanol therefrom and obtain a residue containing ammonium thiocyanate, ammonium chloride, and lower alkyl thiocyanophenol, treating said residue with water to dissolve the ammonium thiocyanate and ammonium chloride therefrom, and recovering the thiocyanophenol.

10. The process according to claim 9 wherein the lower alkyl phenol is m-cresol and the recovered thiocyanophenol is 4-thiocyano-m-cresol.

References Cited by the Examiner
UNITED STATES PATENTS

| | | | |
|---|---|---|---|
| 1,765,678 | 6/30 | Kaufmann et al. | 260—454 |
| 1,790,097 | 1/31 | Kaufmann et al. | 260—454 |
| 1,816,848 | 8/31 | Helwig | 260—454 |

OTHER REFERENCES

Adams: "Organic Reactions," vol. 3, 245 (1946).
Kaufmann et al.: C.A., vol. 23, page 2245 (1929).
Neu: Ber. Deut. Chem., vol. 72, pages 1505–1512 (1939).
Royer et al.: Bull. Soc. Chim., France, vol. of 1957, pages 304–310.
Wykoff et al.: C.A., vol. 54, p. 7054 (1960).
Ziegler et al: Monatshafte fur Chemie, vol. 79, 316–21 (1948).

CHARLES B. PARKER, *Primary Examiner.*